United States Patent [19]

Xue

[11] Patent Number: 5,702,837
[45] Date of Patent: Dec. 30, 1997

[54] BONDING MATERIALS FOR ANODE TO ANODE BONDING AND ANODE TO INTERCONNECT BONDING IN SOLID OXIDE FUEL CELLS

[75] Inventor: Liang An Xue, Lake Hiawatha, N.J.

[73] Assignee: AlliedSignal Inc., Morris Township, N.J.

[21] Appl. No.: 597,000

[22] Filed: Feb. 5, 1996

[51] Int. Cl.$^6$ .................................................. H01M 4/00
[52] U.S. Cl. ................................................ 429/40; 429/41
[58] Field of Search .................................. 429/30, 32, 40, 429/41

[56] References Cited

U.S. PATENT DOCUMENTS

| | | | |
|---|---|---|---|
| 5,162,167 | 11/1992 | Minh et al. | 429/30 |
| 5,290,642 | 3/1994 | Minh et al. | 429/33 |
| 5,403,461 | 4/1995 | Tuller et al. | 429/30 X |
| 5,480,737 | 1/1996 | Sotake et al. | 429/30 |

*Primary Examiner*—M. Nuzzolillo
*Attorney, Agent, or Firm*—Ernest D. Buff

[57] ABSTRACT

An anode/anode bonding material for anode to anode material bonding in SOFC stacks, and an anode/interconnect bonding material for anode material to interconnect material bonding in SOFC stacks are provided. The anode/anode bonding material comprises powders of reactive ingredients, nickel oxide and zirconium oxide as the major components. The anode/interconnect bonding material comprises powders of reactive ingredients, nickel oxide, zirconium oxide, cobalt oxide, calcium oxide or strontium oxide as the major components. The reactive ingredients are selected from the compounds of tungsten, tantalum, niobium, molybdenum, and titanium. During the bonding operation at subsintering temperatures of 1000°–1300° C. the bonding materials react with anode and/or interconnect material to provide strong and reliable anode to anode bonds and/or anode to interconnect bonds that have a bonding strength greater than one megapascal. The respective bonds are compatible with anode and interconnect materials and are electrically conductive in SOFC operating environments.

12 Claims, No Drawings

BONDING MATERIALS FOR ANODE TO ANODE BONDING AND ANODE TO INTERCONNECT BONDING IN SOLID OXIDE FUEL CELLS

BACKGROUND OF THE INVENTION

1. Field of the Invention

This invention relates to solid oxide fuel cell (SOFC) materials and more particularly to bonding materials for use in the fabrication of SOFC stacks.

2. Description of the Prior Art

The solid oxide fuel cell has high potential for production of electrical energy efficiently from cheap fuels or by-product waste gas streams from the petrochemical and metallurgical industries. The solid oxide fuel cell is made of four major components: (1) anode, usually made of a nickel-zirconia cermet; (2) electrolyte, made of a fully stabilized zirconia; (3) cathode, usually made of strontium-doped lanthanum manganite; and (4) interconnect, usually made of doped lanthanum chromite. The adjacent anode, electrolyte, and cathode make up one cell, while the interconnect serves as an internal electrical connection between individual cells which are stacked repetitively to form a SOFC stack. The operating temperature of SOFC may range from 700° to 1,100° C.

There exist many variations of the SOFC designs and construction methods. For example, U.S. Pat. Nos. 4,476,196 (Poeppel, et al.) and 4,476,198 (Ackerman, et al.) describe the construction of monolithic core SOFC. These early SOFCs, however, have encountered problems such as microcracks, ceramic migration, and the slumping of multilayer corrugations in fabrication. These problems lead to poor performance of the SOFC. U.S. Pat. No. 4,857,420 (Maricle, et al.) teaches a monolithic SOFC made from two basic finished component subassemblies stacked repetitively atop each other in alternating fashion. One of the subassemblies is an electrode subassembly and the other is the combined separator-flow field subassembly. The SOFC stack disclosed by Maricle, et al. is relatively free from microcracks in its component layers. U.S. Pat. No. 5,162,167 (Minh et al.) discloses a two-step densifying method for making monolithic SOFC that addresses the problems of microcracks, ceramic migration, and multilayer corrugations slumping. In the Minh, et al. method, anode-electrolyte-cathode separated by a single or trilayer interconnect are first formed and densified. Subsequently, a plurality of the densified cells are stacked and further processed to form a monolithic SOFC.

The methods taught by Maricle, et al. and Minh, et al., require bonding between anode material to anode material. In Maricle, et al., this is achieved through a creep flattening process in which the subassemblies are layered atop each other, heated to an elevated subsintering temperature and subjected to a light compressive load, so that abutting surfaces of the adjacent subassemblies are creep flattened into intimate adherent contact with each other. Half of the abutting surfaces are between anode to anode material and the other half are between cathode to cathode material. A layer of platinum paste may also be used as conductive braze to improve the bond and electrical conductivity between the subassemblies. In Minh, et al. the bonding between anode to anode material is achieved through the use of a bonding agent which comprises the powder of anode ceramic material, a binder, a plasticizer, a solvent, and, optionally, at least one material selected from the group consisting of: ceramic cements, glass ceramics, an organo-metallic sol gel material, zirconium oxide, and platinum. To avoid ceramic migration problems in the cells stack, the creep flattening disclosed by Maricle, et al. and the bonding process disclosed by Minh, et al. have to be carried out at a subsintering temperature at which the atoms and ions diffusion rates are usually not fast enough to produce strong bonds between the two abutting anode materials (Maricle, et al.) or between the bonding agent and the anode material (Minh, et al.). In both cases the anode to anode material bonding between the subassemblies is rather weak and the bond strength is usually lower than one megapascal. Upon being subject to load and vibration, such a weak bonding leads easily to debonding and causes the failure of the SOFC stacks. Consequently, there is a need for a suitable bonding agent which can provide strong and reliable anode to anode material bonding for SOFC applications.

The method taught by Minh, et al. also requires bonding between anode material to interconnect material. This is achieved through the use of a bonding agent which comprises the powders of anode ceramic material and interconnect ceramic material, a binder, a plasticizer, a solvent, and, optionally, at least one material from the group consisting of ceramic cements, glass ceramics, an organo-metallic sol gel material, zirconium oxide, and platinum. Since the bonding process has to be carded out at a temperature lower than that of the sintering temperature to avoid the ceramic migration problem in the cells stack, the atoms and ions diffusion rates are usually not fast enough to produce strong bonds between the anode and interconnect material. The bonding is weak and the bond strength is usually much lower than one megapascal. Accordingly, there is also a need for a suitable bonding agent which can provide strong and reliable anode to interconnect material bonding for SOFC application.

SUMMARY OF THE INVENTION

The present invention provides an anode/anode bonding material for anode to anode material bonding in SOFC stacks. Generally stated, the bonding material comprises the powders of reactive ingredients, nickel oxide, zirconia, and at least one member selected from the group consisting of alumina, a binder, a plasticizer, a rice or corn starch, and a solvent. The reactive ingredients are selected from the compounds of tungsten, tantalum, niobium, molybdenum, and titanium, including the compounds of these elements with nickel, zirconium, silicon, and aluminum. The binder is selected from the group consisting of polyvinyl butyryl resin, polyvinyl alcohol, synthetic rubber, plastics, cellulose, and polymer systems which thermally decompose without cross linking. The plasticizer is selected from the group consisting of butyl benzyl phthalate and solvents of the phthalate group. The solvent can be selected from any type of inorganic or organic solvent, for example, water or an alcohol, as long as it can evaporate at elevated temperatures. Additives of up to 30 wt % may also be added to the bonding material. The said additives are oxides (such as nickel-aluminate spinel, cobalt oxide, silica, zirconium silicate, aluminum silicate, lanthanum zirconate), carbides (such as silicon carbide, boron carbide) and noble metals (such as platinum, palladium, rhodium, and their alloys). The oxides used in the bonding composition may be conveniently substituted by their precursors from which the oxides can be derived, e.g. nitrates, carbonates, organo-metallic materials, or the corresponding metal elements themselves. The bonding material is applied as an interlayer between the faying surfaces of the anode material pairs to be bonded. During the bonding operation at subsintering temperatures of 1000°–1300° C. these reactive ingredients in the bonding material react with anode material to provide strong and reliable anode to anode bonds that have a bonding strength greater than one megapascal. The bonds are compatible with anode material and are electrically conductive in SOFC operating environments.

The present invention also provides an anode/interconnect bonding material for anode material to interconnect material bonding in SOFC stacks. The bonding material comprises the powders of reactive ingredients, nickel oxide, zirconium oxide, cobalt oxide, calcium oxide or strontium oxide (where strontium oxide is selected instead of calcium oxide for bonding interconnect material made of strontium-doped lanthanum chromite), and at least one member selected from the group consisting of alumina, lanthanum oxide, chromium oxide, lanthanum chromite, a binder, a plasticizer, a rice or corn starch, and a solvent. The reactive ingredients are selected from the compounds of tungsten, tantalum, niobium, molybdenum, and titanium, including the compounds of these elements with nickel, zirconium, silicon, and aluminum. The binder is selected from the group consisting of polyvinyl butyryl resin, polyvinyl alcohol, synthetic rubber, plastics, cellulose, and polymer systems which thermally decompose without cross linking. The plasticizer is selected from the group consisting of butyl benzyl phthalate and solvents of the phthalate group. The solvent can be selected from any type of inorganic or organic solvent, for example, water or an alcohol, as long as it evaporates at room temperature or at elevated temperatures. Additives of up to 30 wt % may also be added to the bonding material. The additives are oxides (such as nickel-aluminate spinel, silica, zirconium silicate, aluminum silicate, lanthanum zirconate), carbides (such as silicon carbide, boron carbide) and noble metals (such as platinum, palladium, rhodium, and their alloys). The oxides used in the bonding composition may be conveniently substituted by their precursors from which the oxides can be derived, e.g. nitrates, carbonates, organo-metallic materials, or the corresponding metal elements themselves. The bonding material is applied as an interlayer between the faying surfaces of the anode material and interconnect material pairs to be bonded. During the bonding operation at subsintering temperatures of 1000°–1300° C. these reactive ingredients in the bonding material react with anode material at one side and with interconnect material at the other side to provide strong and reliable anode to interconnect bonds that have a bonding strength greater than one megapascal. The presence in the bonding composition of the oxides of lanthanum, chromium, cobalt, calcium or strontium, which can react to form doped lanthanum chromite (i.e., interconnect material), also enhances the bonding to interconnect material. The bonds thus created are compatible with both anode material and interconnect material and are conductive in SOFC operating environments.

In one embodiment, the present invention provides an anode/anode bonding slurry that comprises the said solvent and the following solid components: 1–50 wt % said reactive ingredients, 5–60 wt % nickel oxide, 5–50 wt % zirconium oxide, 1–20 wt % alumina. The weight ratio of the solvent to the solid components in the slurry can vary from 1:3 to 6:1. Small amount of binder as well as dispersing agent may also be added to the slurry. The slurry can be brushed or sprayed onto the surfaces of the anode material pairs to be bonded. The stacked assembly is then heat treated to a temperature of 1000°–1300° C. and preferably under a compression pressure of 0.001–1 megapascal to complete the bonding operation.

In another embodiment, the present invention provides an anode/anode bonding tape that comprises 1–50 wt % of the aforesaid reactive ingredients, 5–60 wt % nickel oxide, 5–50 wt % zirconium oxide, 2–20 wt % binder, 2–20 wt % plasticizer, 0–10 wt % starch, 1–20 wt % alumina. Such a bonding tape can be made by such processes as calendering or roll milling, tape casting, and extruding. Pieces of the bonding tape are placed between the surfaces of the anode material pairs to be bonded. One benefit of using the bonding tape instead of a bonding slurry is that it is easier to control the bonding interlayer thickness by applying a bonding tape with a known thickness. Another benefit of using the tape is that it provides sufficient 'green' strength for the assembled SOFC stack before the final heat treatment so as to facilitate the handling of the stack. The stacked assembly is then heat treated to a temperature of 1000°–1300° C. and preferably under a compression pressure of 0.001–1 megapascal, to complete the bonding operation.

In still another embodiment, the present invention provides an anode/interconnect bonding slurry that comprises the aforesaid solvent and the following solid components: 1–50 wt % reactive ingredients, 5–60 wt % nickel oxide, 5–50 wt % zirconium oxide, 1–20 wt % alumina, 1–20 wt % cobalt oxide, 1–20 wt % calcium oxide or 1–20 wt % strontium oxide (where strontium oxide is selected instead of calcium oxide for bonding interconnect material made of strontium-doped lanthanum chromite), 0–20 wt % lanthanum oxide, 0–20 wt % chromium oxide, 0–30 wt % lanthanum chromite. The weight ratio of the solvent to the solid components in the slurry can vary from 1:3 to 6:1. Small amount of binder as well as dispersing agent may also be added to the slurry. The slurry can be brushed or sprayed onto the surfaces of anode material and interconnect material pairs to be bonded. The stacked assembly is then heat treated to a temperature of 1000°–1300° C., and preferably under a compression pressure of 0.001–1 megapascal, to complete the bonding operation.

In a still further embodiment, the present invention provides an anode/interconnect bonding tape that comprises 1–50 wt % of the aforesaid reactive ingredients, 5–60 wt % nickel oxide, 5–50 wt % zirconium oxide, 1–20 wt % cobalt oxide, 1–20 wt % calcium oxide or 1–20 wt % strontium oxide (where strontium oxide is selected instead of calcium oxide for bonding interconnect material made of strontium-doped lanthanum chromite), 2–20 wt % binder, 2–20 wt % plasticizer, 0–10 wt % starch, 1–20 wt % alumina, 0–20 wt % lanthanum oxide, 0–20 wt % chromium oxide, 0–30 wt % lanthanum chromite. Such a bonding tape can be made by processes such as calendering or roll milling, tape casting, and extruding. Pieces of the bonding tape are placed between the faying surfaces of anode material and interconnect material pairs to be bonded. One benefit of using the bonding tape instead of a bonding slurry is that it is easier to control the bonding interlayer thickness by applying a bonding tape with a known thickness. Another benefit of using the tape is that it provides sufficient 'green' strength for the assembled SOFC stack before the final heat treatment so as to facilitate the easy handling of the stack. The stacked assembly is then heat treated to a temperature of 1000°–1300° C. and preferably under a compression pressure of 0.001–1 megapascal to complete the bonding operation.

Advantageously, anode/anode bonding provides strong and reliable bonding between anode and anode material with a shear strength greater than one megapascal and that the said anode/interconnect bonding material provides strong bonding between anode material and interconnect material with a bond shear strength greater than one megapascal. The strong bonding preserves the integrity and functionality of the SOFC stack against vibration and disturbance occurred during operation. Another benefit of the present invention is the low material cost thereof. Bonding materials employed in the present invention are very inexpensive. The anode/anode bonding material and the anode/interconnect bonding material can also be substituted for each other. In most cases such a substitution produces satisfactory bonding results. However, for optimal bonding results, the anode/anode bonding material should be used for anode to anode material bonding, and the anode/interconnect bonding material should be used for anode to interconnect material bonding.

DETAILED DESCRIPTION OF THE PREFERRED EMBODIMENTS

The invention will be more fully understood and further advantages will become apparent when reference is made to the following detailed description of the preferred embodiments of the invention.

The present invention provides an anode/anode bonding material for anode to anode material bonding in SOFC stacks. The bonding material comprises powders of 1-50 wt % (preferably 245 wt %) reactive ingredients, 5-60 wt % (preferably 10-50 wt %) nickel oxide, 5-50 wt % (preferably 10-40 wt %) zirconium oxide, and also at least one of the following materials: 1-20 wt % (preferably 2-15 wt %) alumina, 0-20 wt % (preferably 3-10 wt %) binder, 0-20 wt % (preferably 3-10 wt %) plasticizer, 0-10 wt % (preferably 2-8 wt %) rice or corn starch, and 0-85 wt % (preferably 25-75 wt %) solvent. The reactive ingredients are selected from the compounds of tungsten, tantalum, niobium, molybdenum, and titanium, preferably the oxides of these elements, including the compounds of these elements with nickel, zirconium, silicon, and aluminum. The binder is selected from the group consisting of polyvinyl butyryl resin, polyvinyl alcohol, synthetic rubber, plastics, cellulose, and polymer systems which thermally decompose without cross linking. The plasticizer is selected from the group consisting of butyl benzyl phthalate and solvents of the phthalate group. The solvent can be selected from any type of inorganic or organic solvent, for example, water or an alcohol, as long as it evaporates at room temperature or at elevated temperatures. Additives of up to 30 wt % may also be added to the bonding material. The said additives are oxides (such as nickel-aluminate spinel, cobalt oxide, silica, zirconium silicate, aluminum silicate, lanthanum zirconate), carbides (such as silicon carbide, boron carbide) and noble metals (such as platinum, palladium, rhodium, and their alloys). The oxides used in the bonding composition may be conveniently substituted by their precursors from which the oxides can be derived, e.g. nitrates, carbonates, organo-metallic materials, or the corresponding metal elements themselves. The bonding material can be made into the form of either a bonding slurry or a bonding tape using methods known in the field of materials processing. For example, the bonding slurry can be made by mixing and milling, and the bonding tape can be made by calendering or roll milling, tape casting, and extruding. In the bonding slurry the weight ratio of the solvent to the solid components can vary from 1:3 to 6:1. Small amounts of binder as well as dispersing agent may also be added to the bonding slurry. The bonding slurry can be brushed or sprayed onto the faying surfaces of anode material pairs to be bonded. For applying the bonding tape, pieces of it can be placed directly between the faying surfaces of the anode material pairs to be bonded. During the bonding operation at subsintering temperatures of 1000°-1300° C. with or without a compression pressure the reactive ingredients in the bonding material react with anode material. Tungsten oxide when used, for example, as one of the reactive ingredients, reacts with anode material to form zirconium tungstenate, nickel tungstenate (and other tungstenate, if the anode contains other compounds such as cobalt oxide), resulting in strong anode to anode bonds that have shear strength greater than one megapascal. The bonds are compatible with anode material and are conductive in SOFC operating environments.

The present invention also provides an anode/interconnect bonding material for anode material to interconnect material bonding in SOFC stacks. The bonding material comprises the powders of 1-50 wt % (preferably 2-45 wt %) reactive ingredients, 5-60 wt % (preferably 10-50 wt %) nickel oxide, 5-50 wt % (preferably 10-40 wt %) zirconium oxide, 0-20 wt % (preferably 2-10 wt %) cobalt oxide, 1-20 wt % (preferably 2-10 wt %) calcium oxide or 0-20 wt % (preferably 2-10 wt %) strontium oxide (where strontium oxide is selected instead of calcium oxide for bonding interconnect material made of strontium-doped lanthanum chromite), and also at least one of the following materials: 0-20 wt % (preferably 3-16 wt %) lanthanum oxide, 0-20 wt % (preferably 3-10 wt %) chromium oxide, 0-30 wt % (preferably 2-15 wt %) lanthanum chromite, 1-20 wt % (preferably 2-15 wt %) alumina, 0-20 wt % (preferably 3-10 wt %) binder, 0-20 wt % (preferably 3-10 wt %) plasticizer, 0-10 wt % (preferably 2-8 wt %) rice or corn starch, and 0-85 wt % (preferably 25-75 wt %) solvent. The reactive ingredients are selected from the compounds of tungsten, tantalum, niobium, molybdenum, and titanium, and preferably the oxides of these elements, including the compounds of these elements with nickel, zirconium, silicon, and aluminum. The binder is selected from the group consisting of polyvinyl butyryl resin, polyvinyl alcohol, synthetic rubber, plastics, cellulose, and polymer systems which thermally decompose without cross linking. The plasticizer is selected from the group consisting of butyl benzyl phthalate and solvents of the phthalate group. The solvent can be selected from any type of inorganic or organic solvent, for example, water or an alcohol, as long as it evaporates at room temperature or at elevated temperatures. Additives of up to 30 wt % may also be added to the bonding material. The said additives are oxides (such as nickel-aluminate spinel, silica, zirconium silicate, aluminum silicate, lanthanum zirconate), carbides (such as silicon carbide, boron carbide) and noble metals (such as platinum, palladium, rhodium, and their alloys). The oxides used in the bonding composition may be conveniently substituted by their precursors from which the oxides can be derived, e.g. nitrates, carbonates, organo-metallic materials, or the corresponding metal elements themselves. The bonding material can be made into the form of either a bonding slurry or a bonding tape using methods known in the field of materials processing. For example, the bonding slurry can be made by mixing and milling, and the bonding tape can be made by calendering or roll milling, tape casting, and extruding. In the bonding slurry the weight ratio of the solvent to the solid components can vary from 1:3 to 6:1. Small amounts of binder or dispersing agent may also be added to the bonding slurry. The bonding slurry can be brushed or sprayed onto the faying surfaces of pairs of anode material and interconnect material to be bonded. For applying the bonding tape, pieces of it can be placed directly between the pairs of anode material and interconnect material surfaces to be bonded. During the bonding operation at subsintering temperatures of 1000°-1300° C. with or without a compression pressure the reactive ingredients in the bonding material react with anode material at one side and with interconnect material at the other side. When used, for example, as one of the reactive ingredients, tungsten oxide reacts with interconnect material to form lanthanum tungstenate and with anode material to form zirconium tungstenate, nickel tungstenate (and, optionally, other tungstenate if the anode contains other compounds such as cobalt oxide), resulting in strong anode to interconnect bonds that have shear strength greater than one megapascal. The presence in the bonding composition of the oxides of lanthanum, chromium, calcium, cobalt, and strontium, which can react to form doped lanthanum chromite (i.e., interconnect material), also enhances the bonding to interconnect material. The bonds are compatible with anode material and are conductive in SOFC operating environments.

Because of the similarity in composition between the said anode/anode bonding material and the said anode/interconnect bonding material, in most cases, the former can be substituted for the latter, and vice versa. This type of substitution usually produces quite satisfactory bonding results. However, for optimal bonding results, said anode/anode bonding material should be used for anode to anode material bonding, and said anode/interconnect bonding material should be used for anode to interconnect material bonding.

The following examples are presented to provide a more complete understanding of the invention. In the bonding experiments, the anode material used is made of a nickel oxide-zirconia composite which converts to a nickel-zirconia cermet in reducing SOFC environment. The interconnect material used is made of a calcium- and cobalt-doped lanthanum chromite. The specific techniques, conditions, materials, proportions and reported data set forth to illustrate the principles and practice of the invention are exemplary and should not be construed as limiting the scope of the invention.

EXAMPLE 1

Preparation of an anode/anode bonding slurry: 3 grams tungsten oxide powder, 1 gram aluminum oxide powder, 2 grams nickel oxide powder, and 1 gram zirconium oxide powder were mixed with 6 grams ethanol. To the mixture several drops of ammonium polyacrylate solution (a dispersing agent) were added. The mixture was then milled for 2 hours using 20 grams zirconium oxide balls of 3 mm diameter as milling medium to make the bonding slurry.

The said slurry was brushed onto the faying surfaces of the anode material pairs to be bonded. The anode pair samples were then heat treated to 1200° or 1250° C. for a time of 30 minutes to 1 hour under a compressive load of 0.01–0.05 megapascal to complete the bonding operation. The bonds thus obtained between anode and anode have a shear strength of over 3 megapascal. The bonds are conductive after being reduced in a hydrogen-containing atmosphere that is equivalent to the SOFC environment the bonds expected to be exposed to during SOFC operation.

EXAMPLE 2

Preparation of an anode/anode bonding tape: A powder mixture was made from 0.75 grams nickel tungstenate (NiWO$_4$), 29.25 grams nickel oxide powder, 3 grams aluminum oxide, 17 grams zirconium oxide, and 1 gram rice starch powder were mixed with 3.31 grams polyvinyl butyral (a binder), 3.31 grams butyl benzyl phthalate (a plasticizer), and 26.52 grams methanol. After drying to evaporate the methanol solvent the batch was then rolled through a calendering mill to make flexible bonding tapes of ≈0.15 mm thick. Pieces cut from the bonding tapes were placed directly between the faying surfaces of the anode material pairs to be bonded. The anode pair samples were then heat treated to 1250° C. for 1 hour under a compressive load of 0.01–0.05 megapascal to complete the bonding operation. The bonds thus obtained between anode and anode have a shear strength greater than 1 megapascal. The bonds are conductive after being reduced in a hydrogen-containing atmosphere.

EXAMPLE 3

Preparation of an anode/interconnect bonding slurry: 1 gram tungsten oxide powder, 0.2 grams aluminum oxide powder, 0.5 grams nickel oxide powder, 0.5 grams lanthanum oxide powder, 0.2 grams chromium oxide powder, 0.3 grams calcium oxide powder, 0.2 grams cobalt oxide powder, and 0.2 grams zirconium oxide powder were mixed with about 8 grams ethanol. To the mixture several drops of ammonium polyacrylate solution (a dispersing agent) were added. The mixture was then milled for 2 hours using 20 grams zirconium oxide balls of 3 mm diameter as milling medium to make the bonding slurry.

The said slurry was brushed onto the faying surfaces of the anode material and interconnect material pairs to be bonded. The anode/interconnect pair samples were then heat treated to 1250° C. for 1 hour under a compressive load of 0.01–0.05 megapascal to complete the bonding operation. The bonds thus obtained between anode and interconnect have a shear strength greater than 1 megapascal. The bonds are conductive after being reduced in a hydrogen-containing atmosphere.

EXAMPLE 4

Preparation of an anode/interconnect bonding tape: A powder mixture was made from 10.49 grams nickel tungstenate (NiWO$_4$), 21.48 grams nickel oxide powder, 2 grams aluminum oxide, 10 grams zirconium oxide, 1 gram calcium oxide, 1.3 grams cobalt oxide, 5 grams lanthanum chromite and 2.56 grams rice starch powder were mixed with 3.57 grams polyvinyl butyral (a binder), 3.57 grams butyl benzyl phthalate (a plasticizer), and 28.58 grams methanol. After drying to evaporate the methanol solvent the batch was then rolled through a calendering mill to make flexible bonding tapes of 0.12 to 0.35 mm thick. Pieces cut from the bonding tapes were placed directly between the faying surfaces of anode and interconnect materials pairs to be bonded. The anode/interconnect pair samples were then heat treated to 1250° C. for 1 hour under a compressive load of 0.01–0.05 megapascal to complete the bonding operation. The bonds thus obtained between anode and interconnect have a shear strength over 5 megapascal. The bonds are conductive after being reduced in a hydrogen-containing atmosphere.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. An anode/anode bonding material for anode to anode material bonding in a solid oxide fuel cell stack, said bonding material comprising powders of 1–50 wt % reactive ingredients, 5–60 wt % nickel oxide, 5–60 wt % Zirconia, and at least one component selected from the group consisting of: 1–20 wt % alumina, 0–20 wt % binder, 0–20 wt % plasticizer, 0–10 wt % rice or corn starch, and 0–85 wt % solvent, said reactive ingredients being selected from the group consisting of oxides of tungsten, tantalum, niobium, molybdenum, titanium, and compounds of these oxides with nickel, zirconium, silicon, and aluminum, said binder being selected from the group consisting of polyvinyl butyryl resin, polyvinyl alcohol, synthetic rubber, plastics, cellulose, and polymer systems which thermally decompose without cross linking, said plasticizer being selected from the group consisting of butyl benzyl phthalate and the phthalate group, said solvent being selected from an inorganic or organic solvent which can evaporate at elevated temperatures, said oxides used in said bonding material being capable of being substituted by their precursors from which the oxides can be derived, said bonding material being applied as an interlayer between the faying surfaces of anode material pairs to be bonded and the bonding operation being completed at subsintering temperatures ranging from about 1000°–1300° C. with or without a compression pressure.

2. An anode/anode bonding material as recited by claim 1, wherein said bonding material further comprises up to 30 wt % of an additive selected from the group consisting of nickel-aluminate spinel, cobalt oxide, silica, zirconium silicate, aluminum silicate lanthanum zirconate, a carbide selected from the group of silicon carbide, boron carbide, and mixtures thereof, a noble metal selected from the group consisting of platinum, palladium, rhodium, and alloys thereof.

3. An anode/anode bonding material as recited by claim 1, wherein said bonding material is made into a bonding slurry by mixing and milling with a solvent, said solvent being an organic solvent or an inorganic solvent and being capable of evaporation at room temperature or at elevated temperatures, said weight ratio of said solvent to the solid components in said bonding slurry varies from 1:3 to 6:1 and the bonding slurry is brushed or sprayed onto the faying surfaces of the anode material pairs to be bonded.

4. An anode/anode bonding slurry as recited by claim 3, wherein said bonding slurry also contains a dispersing agent.

5. An anode/anode bonding material as recited by claim 1, wherein said bonding material is made into a bonding tape by a process selected from the group consisting of calendering, roll milling, tape casting, and extruding, pieces of the bonding tape being placed directly between the faying surfaces of the anode material pairs to be bonded.

6. An anode/interconnect bonding material for anode material to interconnect material bonding in a solid oxide fuel cell stack, said bonding material comprising a powder having 1–50 wt % reactive ingredients and at least one oxide selected from the group of nickel oxide, zirconium oxide, cobalt oxide, calcium oxide and strontium oxide, and additionally comprising at least one of the following materials: 0–20 wt % lanthanum oxide, 0–20 wt % chromium oxide, 0–30 wt % ! lanthanum chromite, 1–20 wt % alumina, 0–20 wt % binder, 0–20 wt % plasticizer, 0–10 wt % rice or corn starch, and 0–85 wt % solvent, said reactive ingredients being selected from the group consisting of oxides of tungsten, tantalum, niobium, molybdenum, and titanium, and compounds of these oxides with nickel, zirconium, silicon, and aluminum, said binder being selected from the group consisting of polyvinyl butyryl resin, polyvinyl alcohol, synthetic rubber, plastics, cellulose, and polymer systems which thermally decompose without cross linking, said plasticizer being selected from the group consisting of butyl benzyl phthalate and the phthalate group, said solvent being an inorganic or organic solvent which evaporates at room temperature or at elevated temperatures, said oxides used in the bonding composition being capable of being substituted by their precursors from which the oxides are derived, and including nitrates, carbonates, organo-metallic materials, or the corresponding metal elements themselves, said bonding material being applied as an interlayer between the faying surfaces of the anode and interconnect material pairs to be bonded and the bonding operation being completed at subsintering temperatures of 1000°–1300° C. with or without a compression pressure.

7. An anode/interconnect bonding material as recited by claim 6, wherein said bonding material further contains up to 30 wt % of one or more of the following additives: an oxide selected from the group consisting of nickel-aluminate spinel, silica, zirconium silicate, aluminum silicate, and lanthanum zirconate, a carbide selected from the group consisting of silicon carbide, boron carbide and mixtures thereof and a noble metal selected from the group consisting of platinum, palladium, rhodium, and alloys thereof.

8. An anode/interconnect bonding material as recited by claim 6, wherein the bonding material is made into a bonding slurry by mixing and milling with a solvent, said solvent being an organic solvent or an inorganic solvent and being capable of evaporation at room temperature or at elevated temperature the weight ratio of the solvent to the solid components in the bonding slurry varying from 1:3 to 6:1, and the bonding slurry being brushed or sprayed onto the faying surfaces of the anode and interconnect pairs to be bonded.

9. An anode/interconnect bonding slurry as recited by claim 8, wherein the said bonding slurry also contains a dispersing agent.

10. An anode/interconnect bonding material as recited by claim 6, wherein said bonding material is made into a bonding by a process selected from the group consisting of calendering or roll milling, tape casting, and extruding, pieces of the bonding tape of a predetermined thickness being placed directly between the faying surfaces of the anode and interconnect pairs to be bonded.

11. An anode to anode apparatus having a bond shear strength greater than one megapascal.

12. An anode to interconnect apparatus having a bond shear strength greater than one megapascal.

* * * * *